United States Patent
Wang et al.

(10) Patent No.: US 10,832,069 B2
(45) Date of Patent: Nov. 10, 2020

(54) LIVING BODY DETECTION METHOD, ELECTRONIC DEVICE AND COMPUTER READABLE MEDIUM

(71) Applicant: BEIJING KUANGSHI TECHNOLOGY CO., LTD., Beijing (CN)

(72) Inventors: Peng Wang, Beijing (CN); Jianghu Lu, Beijing (CN); Yahao Sun, Beijing (CN)

(73) Assignee: BEIJING KUANGSHI TECHNOLOGY CO., LTD., Beijing (CN)

(*) Notice: Subject to any disclaimer, the term of this patent is extended or adjusted under 35 U.S.C. 154(b) by 76 days.

(21) Appl. No.: 16/155,375

(22) Filed: Oct. 9, 2018

(65) Prior Publication Data

US 2019/0362171 A1    Nov. 28, 2019

(30) Foreign Application Priority Data

May 25, 2018    (CN) .......................... 2018 1 0517525

(51) Int. Cl.
| G06K 9/00 | (2006.01) |
| G06T 7/73 | (2017.01) |
| G06K 9/62 | (2006.01) |

(52) U.S. Cl.
CPC ..... *G06K 9/00906* (2013.01); *G06K 9/00221* (2013.01); *G06K 9/00744* (2013.01);
(Continued)

(58) Field of Classification Search
CPC ........... G06K 9/00906; G06K 9/00221; G06K 9/00744; G06K 9/6257; G06K 9/6288;
(Continued)

(56) References Cited

U.S. PATENT DOCUMENTS 5,457,754 A * 10/1995 Han ...................... G06T 7/0012
                                                    382/128
7,987,111 B1 *  7/2011 Sharma .............. G06Q 30/0201
                                                    705/7.29
(Continued)

FOREIGN PATENT DOCUMENTS

| CN | 104834900 | 8/2015 |
| CN | 106650646 | 5/2017 |
| CN | 107895155 | 4/2018 |

OTHER PUBLICATIONS

First Chinese Office Action, issued by the Chinese Patent Office in the corresponding Chinese patent application No. 201810517525.0, dated May 29, 2020, 16 pages.

*Primary Examiner* — Ali Bayat
(74) *Attorney, Agent, or Firm* — Hamre, Schumann, Mueller & Larson, P.C.

(57) ABSTRACT

The present disclosure provides a living body detection method, an electronic device and a computer readable medium. The living body detection method includes: obtaining video images of a target object; extracting a first image and a second image from the video images, wherein the first image is used to represent static information in the video images, and the second image is used to represent position change information of all pixel points in the video images; making a living body analysis on the first image to obtain a first analysis result, making a second body analysis on the second image to obtain a second analysis result, and determining whether the target object is a living body according to the first analysis result and the second analysis result.

10 Claims, 5 Drawing Sheets

(52) U.S. Cl.
CPC ......... *G06K 9/6257* (2013.01); *G06K 9/6288* (2013.01); *G06T 7/73* (2017.01); *G06T 2207/10016* (2013.01); *G06T 2207/10024* (2013.01); *G06T 2207/20076* (2013.01); *G06T 2207/20081* (2013.01); *G06T 2207/30201* (2013.01)

(58) Field of Classification Search
CPC . G06T 2207/10016; G06T 2207/10024; G06T 2207/20076; G06T 2207/20081; G06T 2207/30201; G06T 7/73
USPC ....................................................... 382/118
See application file for complete search history.

(56) References Cited

U.S. PATENT DOCUMENTS

| | | | |
|---|---|---|---|
| 10,504,560 B2* | 12/2019 | Lee | G11B 27/031 |
| 2010/0007665 A1* | 1/2010 | Smith | G06T 13/40 |
| | | | 345/473 |
| 2015/0227784 A1* | 8/2015 | Roy | G06K 9/00771 |
| | | | 382/103 |
| 2018/0211096 A1* | 7/2018 | Cao | G06K 9/00255 |
| 2018/0239955 A1* | 8/2018 | Rodriguez | G06K 9/00335 |
| 2019/0298244 A1* | 10/2019 | Arai | G06K 9/00268 |

* cited by examiner

LIVING BODY DETECTION METHOD, ELECTRONIC DEVICE AND COMPUTER READABLE MEDIUM

CROSS-REFERENCE TO RELATED APPLICATION

The present application claims the priority of Chinese patent application No. 201810517525.0 filed on May 25, 2018, the disclosure of which is incorporated herein by reference in its entirety.

TECHNICAL FIELD

The present disclosure relates to a technique field of image processing, in particular to a living body detection method, an electronic device and a computer readable medium.

BACKGROUND

As human face recognition technique has been widely applied, there has been a growing concern for the use security of the human face recognition technique. One of the human face recognition technique is a human face based living body detection technique. The human face based living body detection technique refers to technique being capable of automatically determining whether a given image or a human face in a video comes from a real person or comes from a cheated human face (for example, a face mask, a printed photo, a photo displayed on the screen or a played video clip, etc.). The human face based living body detection technique is an important technical measure of anti-attack and fraud protection, and has a wide range of applications in industries and occasions concerning remote identity authentication such as bank, insurance, Internet finance, electronic commerce, etc.

The existing human face based living body detection technique can be generally divided into two categories: static method and dynamic method. Herein, the static method has characteristics of simplicity and high efficiency, but the security level of the static method is not high. The reason is that a static human face image can be easily fabricated by means of PS, synthesis software and high definition screen display picture, and so on. As the technique has been developing, difficulty and cost of the technique of such fabricating manner would be getting cheaper and cheaper. The dynamic method mainly refers to various judgments on single frame images based on gestures, and it requires the user to complete a designated facial gesture such as opening mouth, winking or the like in front of a camera. However, these facial gestures increase difficulty in implementing the technique, and at the same time reduce the user experience. In conclusion, the existing human face living body detection method is based on a single frame image, and has either a low security level or a complicated gesture.

SUMMARY

Given that, a purpose of the present disclosure is to provide a living body detection method and apparatus, an electronic device and a computer readable medium, so as to alleviate the technical problem of low security level and complicated gesture difficulty for a user in a conventional living body detection technique.

An embodiment of the present disclosure provides a living body detection method, comprising: obtaining video images of a target object, wherein the video images include a plurality of image frames, each of which includes facial information of the target object; extracting a first image and a second image from the video images, wherein the first image is used to represent static information in the video images, and the second image is used to represent position change information of all pixel points in the video images; making a living body analysis on the first image to obtain a first analysis result, making a living body analysis on the second image to obtain a second analysis result, and determining whether the target object is a living body according to the first analysis result and the second analysis result.

An embodiment of the present disclosure further provides a living body detection apparatus, comprising: a first obtaining unit, configured to obtain video images of a target object, wherein the video images include a plurality of image frames, each of which includes facial information of the target object; an extracting unit, configured to extract a first image and a second image from the video images, wherein the first image is used to represent static information in the video images, and the second image is used to represent position change information of all pixel points in the video images; an analyzing unit, configured to make a living body analysis on the first image to obtain a first analysis result, make a living body analysis on the second image to obtain a second analysis result, and determine whether the target object is a living body according to the first analysis result and the second analysis result.

An embodiment of the present disclosure further provides an electronic device, comprising: a memory adapted to store compute program instructions and a processor adapted to execute computer program instructions to perform the living body detection method.

An embodiment of the present disclosure further provides a non-volatile store medium storing computer program instructions, wherein the computer program instructions are executed by a computer to perform the living body detection method.

In the embodiments of the present disclosure, firstly, video images of a target object are obtained, wherein the video images include a plurality of image frames, each of which includes facial information of the target object; then, a first image and a second image are extracted from the video images, wherein the first image is used to represent static information in the video images, and the second image is used to represent position change information of all pixel points in the video images; finally, living body analysis is made on the first image and the second image to obtain a first analysis result and a second analysis result respectively, and last, it is determined whether the target object is a living body according to the first analysis result and the second analysis result.

In the embodiments of the present disclosure, static image information and optic flow information (i.e., position change information of the pixel points) in the videos are fully utilized to perform living body detection. Furthermore, the present disclosure does not need the user to make various gestures such as opening mouth, winking, etc., and has advantages of simple and convenient use, high accuracy and high security level, so that the technical problem of low security level and complicated gesture difficulty for a user in a conventional living body detection technique is alleviated.

Other characteristics and advantages of the present disclosure will be described in the following specification, and a part thereof becomes obvious from the specification, or can be known through implementation of the present disclosure. Purposes and other benefits of the present disclosure are realized and obtained in the specification, the Claims and structures specially pointed out in the figures.

In order to make the above purposes, characteristics and advantages of the present disclosure more evident and easier to be understood, preferred embodiments are presented in the following text in accompanying with drawings in detail.

BRIEF DESCRIPTION OF THE DRAWINGS

In order to describe specific implementations of the present disclosure or technical solutions in the prior art more clearly, accompanying figures needed to be used in description of specific implementations or the prior art will be introduced briefly. Obviously, the figures described below are some implementations of the present disclosure. For those ordinary skilled in the art, other figures can be obtained based on these figures without paying any inventive labor.

DETAILED DESCRIPTION

In order to make purposes, technical solutions and advantages of embodiments of the present disclosure more clearly, the technical solutions of the present disclosure will be described clearly and completely by combining with figures. Obviously, the embodiments described below are a part of embodiments of the present disclosure, but not all embodiments. Based on the embodiments in the present disclosure, all the other embodiments obtained by those ordinary skilled in the art without paying any inventive labor shall fall into the scope sought for protection in the present disclosure.

Figure 1:
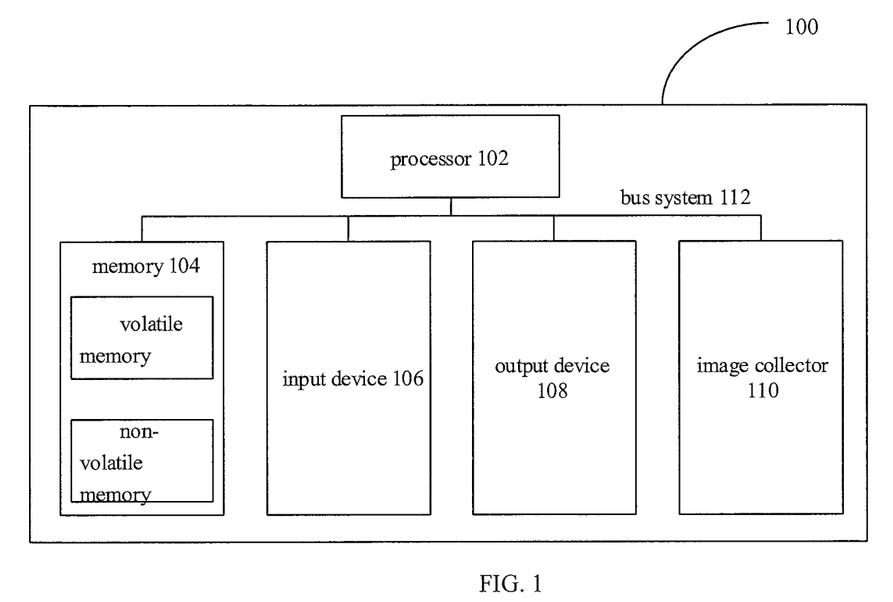
FIG. 1 is a schematic diagram of an electronic device provided in an embodiment of the present disclosure.

Firstly, an electronic device 100 configured to implement an embodiment of the present disclosure is described by referring to FIG. 1. The electronic device can be applicable to execute a living body detection method of respective embodiments of the present disclosure.

As shown in FIG. 1, the electronic device 100 comprises one or more processors 102, one or more memories 104, an input device 106, an output device 108, and an image collector 110. These components are connected with each other via a bus system 112 and/or connecting mechanisms (not shown) of other forms. It shall be noted that components and structures of the electronic device 100 as shown in FIG. 1 are just for illustration, but not for limitation. The electronic device may have other components and other structures according to the actual requirements.

The processor 102 can be realized by at least one hardware form of a digital signal processor (DSP), a field programmable gate array (FPGA), a programmable logic array (PLA) and an application specific integrated circuit (ASIC). The processor 102 may be a central processing unit (CPU) or a processing unit in other forms having data processing capability and/or instruction executing capability, and can control other components in the electronic device 100 to perform the desired functions.

The memory 104 can comprise one or more computer program products. The computer program product can comprise various forms of computer readable medium, for example, volatile memory and/or non-volatile memory. The volatile memory can comprise for example a random access memory (RAM) and/or a cache memory (cache) and so on and so forth. The non-volatile memory can comprise for example a read-only-memory (ROM), a hardware, a flash memory, etc. One or more computer program instructions can be stored on the computer readable storage medium. The processor 102 can execute the program instruction, so as to realize client functions and/or other desired functions (realized by the processor) in the embodiments of the present disclosure as described below. A diversity of applications and various data can be stored in the computer readable medium, for example, various data used and/or produced by the applications.

The input device 106 can be a device used by a user to input instructions, and can comprise one or more of a keyboard, a cursor mouse, a microphone and a touch screen, or the like.

The output device 108 can output various information (for example, image or sound) to the outside (for example, user), and can include one or more of a display, a loudspeaker, etc.

The image collector 110 is configured to collect images, wherein data collected by the image collector is processed by the living body detection method to obtain a living body detection result, for example, the image collector can photograph images (for example, pictures, videos, etc.) expected by the user. Then, the images are processed by the living body detection method to obtain a living body detection result. The image collector can store the photographed image in the memory 104 so that the photographed image can be used by other components.

Exemplarily, the electronic device used to implement a living body detection method according to an embodiment of the present disclosure can be realized as an intelligent terminal such as a camera, a capturing machine, a smart phone, a tablet computer, etc.

According to the embodiment of the present disclosure, there is provided an embodiment of a living body detection method. It needs to specify that steps as shown in flow diagrams of the accompanying figures can be performed in a computer system of a set of computer executable instructions. Moreover, although logic sequence is shown in the flow diagrams, in certain occasions, steps shown or described herein can be performed in a sequence different from the sequence herein.

Figure 2:
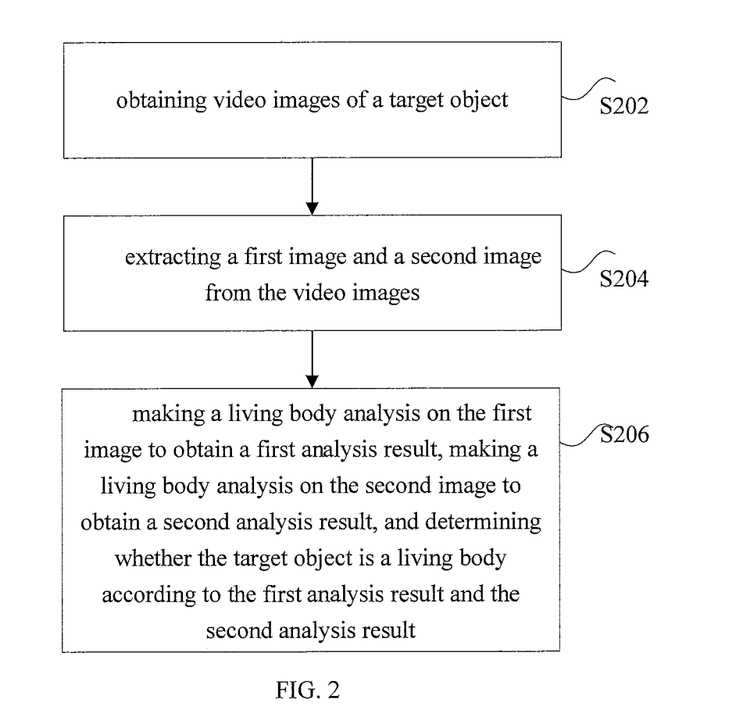
FIG. 2 is a flow diagram of a living body detection method provided in an embodiment of the present disclosure.

FIG. 2 is a living body detection method according to an embodiment of the present disclosure. As shown in FIG. 2, the method comprises following steps:

step S202, obtaining video images of a target object, wherein the video images include a plurality of image frames, each of which includes facial information of the target object.

In the present embodiment, videos corresponding to the video images can be called as static and silent videos, and represent facial videos recorded when a face of an object is in a static and silent state, wherein the face being in a static and silent state means that no major change occurs to respective organs of the face. The above target object may be a person, or may be objects other than persons on which living body detection would be performed, to which no specific limitation is given in the embodiment.

When living body detection is performed on the target object, firstly, video images of the target objects are collected, wherein the video images are images including facial information of the target objects the target objects and recorded when the target objects gaze at a screen or lens of a camera for a period of time (such as 2 or 3 seconds). Herein, the screen or lens are the screen or lens (i.e., image collector 110 in FIG. 1) in the electronic device as shown in FIG. 1.

It needs to specify that in the embodiment, a time length of videos composed by the video images may not be limited to 2 or 3 seconds, and can be adjusted according to the actual requirements, for example, the time length of the video is adjusted according to recognition accuracy and recognition speed of the electronic device as shown in FIG. 1.

Step S204, extracting a first image and a second image from the video images, wherein the first image is used to represent static information of the video image, and the second image is used to represent position change information of all pixel points in the video images.

After the video images are obtained, the first image and the second image are extracted from the video images. In the embodiment, the first image can be called as a red green blue (RGB) image, and the second image can be called as a Flow image.

The RGB image is used to express the static information in the static images; the Flow image is a grayscale image, which is extracted and obtained by an optical flow algorithm, and expresses optical flow information of the video images, i.e., representing the position change information of all the pixel points in the video images. It can be understood as a position of all the pixel points in a previous image frame that appears in a current image frame.

Step S206, making a living body analysis on the first image to obtain a first analysis result, making a living body analysis on the second image to obtain a second analysis result, and determining whether the target object is a living body according to the first analysis result and the second analysis result.

After the first image and the second image are obtained, a living body analysis can be made on the first image and the second image through target living body detection models, to obtain the first analysis result and the second analysis result respectively.

It needs to specify that the target living body detection models are models obtained after original living body detection models are trained through a training sample in advance, wherein the original living body detection models are models constructed based on machine learning algorithm. Herein, the machine learning algorithm includes but not limited to a random forests algorithm, a support vector regression algorithm, and neutral network algorithm. Of course, it can further comprise other machine learning algorithms. The embodiment of the present disclosure does not limit forms of the machine learning algorithm.

In the embodiments of the present disclosure, firstly, video images of a target object are obtained, wherein the video images include a plurality of image frames, each of which includes facial information of the target object; then, a first image and a second image are extracted from the video images, wherein the first image is used to represent static information in the video images, and the second image is used to represent position change information of all pixel points in the video images; finally, living body analysis is made on the first image and the second image to obtain a first analysis result and a second analysis result respectively, and last, it is determined whether the target object is a living body according to the first analysis result and the second analysis result.

In the embodiments, static image information and optic flow information (i.e., position change information of the pixel points) in the videos are fully utilized to perform living body detection. Furthermore, the present disclosure does not need the user to make various gestures such as opening mouth, winking, etc., and has advantages of simple and convenient use, high accuracy and high security level, so that the technical problem of low security level and complicated gesture difficulty for a user in a conventional living body detection technique is alleviated.

Before living body detection is performed on the target object through the target living body detection models, it needs to train the original living body detection model of the target living body detection models. The training process of the original living body detection model will be described in detail by combining with specific embodiments.

Figure 3:
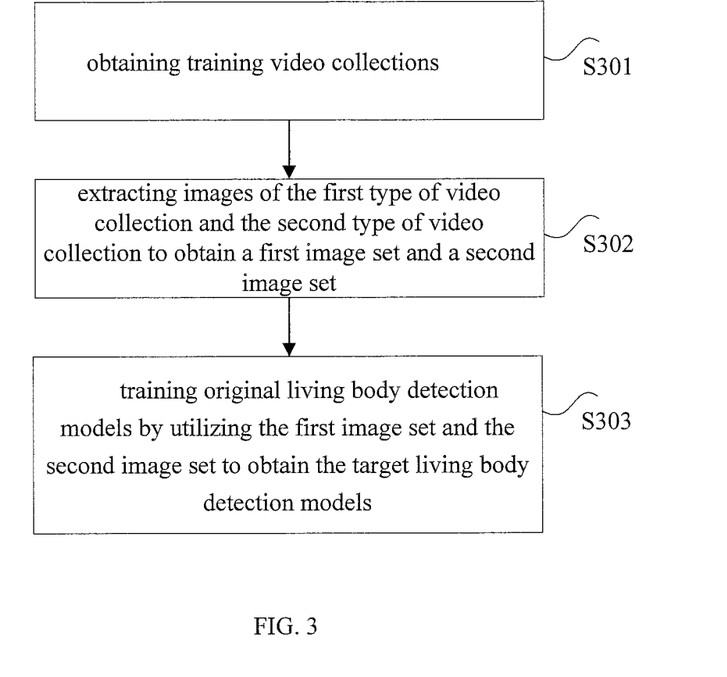
FIG. 3 is an optional flow diagram of a target living body detection model training method provided in an embodiment of the present disclosure.

FIG. 3 is a flow diagram of a target living body detection model training method provided in the present disclosure. In the process of training the target living body detection models, as shown in FIG. 3, the method comprises following steps:

Step S301, obtaining training video collections, wherein the training video collections include: a first type of video collection and a second type of video collection, wherein image frames of the first type of video collection include facial information when a face of a living body object is in a static state, and image frames of the second type of video collection include facial information when a face of a non-living body object is in a static state;

Step S302, extracting images from the first type of video collection and the second type of video collection to obtain a first image set and a second image set, wherein images in the first image set is used to represent static information of training videos in the training video collections, and images in the second image set are used to represent position change information of all pixel points in the training videos;

Step S303, training original living body detection models by utilizing the first image set and the second image set to obtain the target living body detection models.

In the present embodiment, the first type of video collection includes a plurality of videos. Each video a video that includes facial information of the living body object and is shot when the face of the living body object is in a static and silent state, for example, human face videos including facial information of a plurality of real persons. The second type of video collection also includes a plurality of videos. Each video is a video that includes facial information of a non-living body object and is shot when the non-living body object is in a static and silent state. Herein, the non-living body object can be an object wearing a false mask, a picture including facial images, facial images displayed on a display screen, etc.

It needs to specify that the first type of video collection can be called as a living body video collection, for example, real person video collection; the second type of video collection can be called as a non-living video collection, for example, dummy person video collection.

After the first type of video collection and the second type of video collection are obtained, images are extracted from image frames in the first type of video collection and the second type of video collection respectively, to obtain the first image set and the second image set. Herein, the first image set is a RGB image set, and the second image set is a Flow image set.

In particular, in the present embodiment, RGB images are extracted from both the living body video collection and the non-living body video collection, to form the first image set; and Flow images are extracted from both the living body video collection and the non-living body video collection, to form the second image set.

When the RGB images are extracted from the living body video collection or the non-living body video collection, the manner described below is adopted for each video of the first type of video collection and the second type of video collection. Description is provided by taking one video as an example, and no further details are given herein.

Firstly, one video is divided into several interval segments (for example, 3). Then, one RGB image is extracted from each interval segment randomly, so as to represent one video by using the RGB images of segments. By means of processing described above, it is capable of removing redundant information in the video, thereby reducing computational complexity of the electronic device. After the RGB images are extracted from the first type of video collection and the second type of video collection in the above way, the first image set is obtained.

It needs to specify that the above several interval segments can be customized, and are not specially defined in the present embodiment. For example, the quantity of the interval segments can be defined depending on the length of the video and the accuracy of detection. The longer the video is, the more the quantity of interval segments is; the higher the accuracy of detection is, the more the quantity of interval segments is.

When the Flow images are extracted from the living body video collection or the non-living body video collection, the manner described below is adopted for each video of the first type of video collection and the second type of video collection. Description is provided by taking one video as an example, and no further details are given herein.

Firstly, the video is divided into several interval segments (for example, 3), 2*n continuous Flow images are extracted from each interval segment, wherein the 2*n continuous Flow images include n continuous Flow images in the direction of x and n continuous Flow images in the direction of y. In the present embodiment, the segments*2*n Flow images represent the video, which is capable of removing the redundant information in the video, and thus reduces the computational amount of the electronic device. After the Flow images are extracted from the first type of video collection and the second type of video collection in the above way, the second image set is obtained. Herein, segments are the quantity of the intervals.

It needs to specify that the above several interval segments can be customized and needs to be defined depending on the length of the video and the accuracy of detection. The longer the video is, the more the quantity of interval segments is; the higher the accuracy of detection is, the more the quantity of interval segments is.

Additionally, the Flow image is a grayscale image, and is extracted and obtained by the optical flow algorithm, i.e., representing position information change of all the pixel points of the videos in the training video collection, which can be understood as a position of all the pixel points in the previous image frame that appears in the current image frame. According to the two-dimensional space coordinate system, displacement of a previous image frame in the directions of the coordinate axis x and the coordinate axis y can be extracted. Therefore, two Flow images can be extracted from one image frame, i.e., Flow_x and Flow_, wherein, Flow_x represents continuous Flow images in the direction of x, and Flow_y represents continuous Flow images in the direction of y.

The reason for extracting n continuous Flow images is that the Flow image represents the optical flow information of all the pixel points. Therefore, only constantly extracting n Flow images can really represent displacement information of one video in the time domain.

It needs to specify that under normal circumstances, the value of n is smaller than the number of image frames included in the interval segments, but is greater than 1.

After the first image set and the second image set are obtained, the training set is obtained at this ti,e; next, the original living body detection models can be trained by utilizing the first image set and the second image set, so as to obtain the target living body detection models.

In an optional implementation, the first image set can be utilized to train a first original detection model of the original living body detection models to obtain a first detection model of the target living body detection models.

In the present embodiment, the original RGB model (i.e., a first original detection model) is trained by utilizing the RGB image set (i.e., the first image set), to obtain the RGB model (i.e., a first detection model) of the target living body detection models. The algorithm adopted by the RGB model may be any one of a random forests algorithm, a support vector regression algorithm, and neutral network algorithm, etc.

In another optional implementation, a second original detection model of the original living body detection models can be trained by utilizing the second image set, to obtain a second detection model of the target living body detection models.

In the present embodiment, the original Flow model (i.e., second original detection model) is trained by utilizing the Flow image set (i.e., second image set), to obtain a Flow model (i.e., a second detection model) of the target living body detection models. The algorithm adopted by the Flow model may be any one of a random forests algorithm, a support vector regression algorithm, and neutral network algorithm, etc.

The above content introduces the method for training the target living body detection models in detail. The living body detection method of the present disclosure will be described below in detail.

Figure 4:
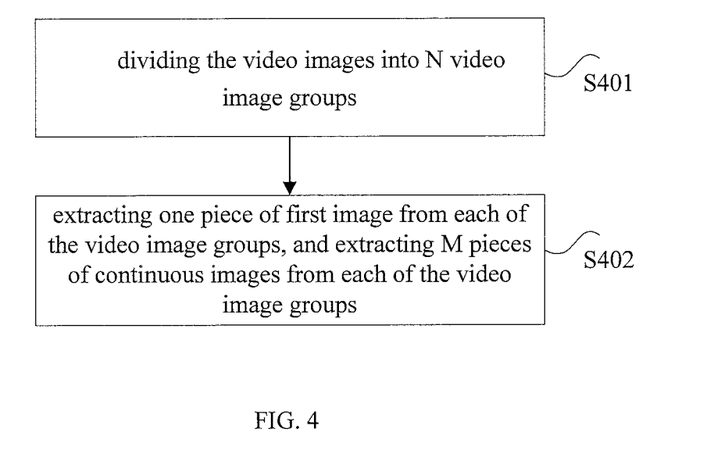
FIG. 4 is an optional flow diagram of extracting a first image and a second image from video images provided in an embodiment of the present disclosure.

As shown in FIG. 4, in an optional embodiment, extracting a first image and a second image from video images comprises following steps:

Step S401, dividing the video images into N video image groups, where N is a positive integer greater than 1;

Step S402, extracting one first image from each video image group, and extracting M continuous second images from each video image group, where M is a positive integer greater than 1.

In the present embodiment, after the video images are obtained, firstly, the video images are divided into N video image groups, each of which includes a plurality of image frames. In particular, the value of N can be customized, and needs to be defined depending on the length of the video and the accuracy of detection. The longer the video is, the more the quantity of interval segments is; the higher the accuracy of detection is, the more the quantity of interval segments is.

It needs to note that the N herein may be the same as or different from the segments described above, to which the embodiment of the present disclosure does not give any specific imitation.

After the N video image groups are obtained, one first image is extracted from each video image group, wherein the first image is a RGB image; at the same time, M continuous second images are extracted from each video image group, wherein the M continuous second images are the M continuous Flow images.

By means of processing described above, it is capable of removing redundant information in the video, so as to reduce the computational amount of the electronic device, and enhance the computational speed of the electronic device.

Optionally, when the M continuous second images are extracted from each video image group, M continuous image frames can be selected firstly from each video image group randomly; then, one second image is extracted from each image frame of the M continuous image frames.

Likewise, the M herein may be the same as or different from n in the above description, to which the embodiment of the present disclosure does not give any specific limitation.

Figure 5:
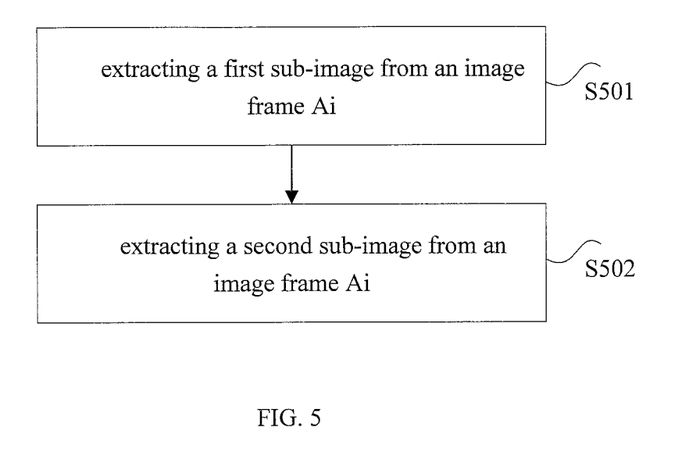
FIG. 5 is an optional flow diagram of extracting one second image from image frames provided in an embodiment of the present disclosure.

As shown in FIG. 5, when the second image includes a first sub-image and a second sub-image, extracting one second image from each image frame of the M continuous image frames comprises following steps:

step S501, extracting a first sub-image from an image frame $A_i$, wherein the first sub-image includes first displacement information, which represents displacement information of pixel points in the direction of axis X in an image frame $A_{i-1}$ and the image frame $A_i$;

step S502, extracting a second sub-image from the image frame $A_i$, wherein the second sub-image includes second displacement information, which represents displacement information of pixel points in the direction of axis Y in the image frame $A_{i-1}$ and the image frame $A_i$;

wherein the image frame $A_i$ is an i-th image frame of the M continuous image frames, and i is a value from 1 to M in sequence.

It needs to specify that the first sub-image can be understood as Flow_x described in the above embodiment, and the second sub-image can be understood as Flow_y described in the above embodiment.

That is to say, in the present embodiment, both one Flow_x and one Flow_y are extracted from each image frame of the M continuous image frames. The Flow_x includes the first displacement information, which represents displacement information of pixel points in the direction of axis X in a previous image frame and a current image frame. The Flow_y includes the second displacement information, which represents displacement information of pixel points in the direction of axis Y in a previous image frame and a current image frame.

After extracting of the second image is completed according to the above process, each video would obtain M second images, wherein each second image includes one first sub-image and one second sub-image. That is to say, after extracting of the second image is completed according to the above process, M*2 Flow images would be obtained.

The above content is a specific process of extracting the first image and the second image from the video images. The process of analyzing the first image and the second image through the target living body detection models will be described below in detail.

Figure 6:
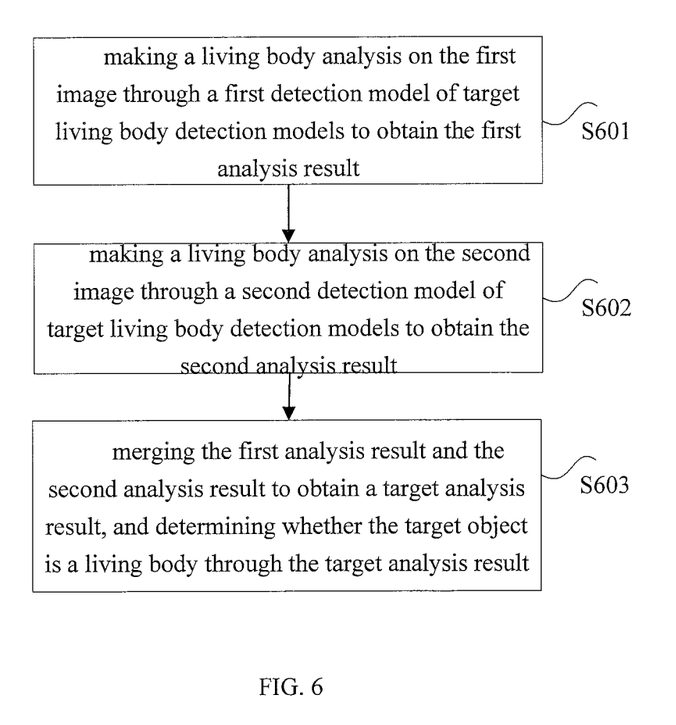
FIG. 6 is an optional flow diagram of analyzing a first image and a second image through a target living body detection model provided in an embodiment of the present disclosure.

In an optical embodiment, by referring to FIG. 6, making a living body analysis on the first image to obtain a first analysis result, making a living body analysis on the second image to obtain a second analysis result, and determining whether the target object is a living body according to the first analysis result and the second analysis result comprises following steps:

step S601, making a living body analysis on the first image through the first detection model of the target living body detection models to obtain a first analysis result, wherein the first analysis result includes: a probability of the target object being a living body and/or the target object being not a living body;

step S602, making a living body analysis on the second image through the second detection model of the target living body detection models to obtain a second analysis result, wherein the second analysis result includes: a probability of the target object being a living body and/or a probability of the target object being not a living body;

step S603, merging the first analysis result and second analysis result to obtain a target analysis result, and determining whether the target object is a living body according to the target analysis result, wherein the target result includes: a probability of the target object being a living body and/or a probability of the target object being not a living body.

In the present embodiment, firstly, the RGB images (i.e., N first images) are analyzed through the RGB model (i.e., the first detection model) of the target living body detection models, to obtain an analysis result (i.e., the first analysis result) of the RGB model.

Then, the Flow images (i.e., M second images, or, M*2 Flow images) are analyzed through the Flow model (i.e., the second detection model) of the target living body detection models, to obtain an analysis result (i.e., the second analysis result) of the Flow model).

Finally, the first analysis result and the second analysis result are merged to obtain a target analysis result, and it is determined whether the target object is a living body according to the target analysis result, wherein the target analysis result includes: a probability of the target object being a living body and/or a probability of the target object being not a living body.

Optionally, merging the first analysis result and the second analysis result to obtain a target analysis result comprises:

firstly, obtaining a preset weight, wherein the preset weight includes a weight of the first analysis result and a weight of the second analysis result;

then, merging the first analysis result and the second analysis result according to the preset weight to obtain the target analysis result.

In an optional implementation of the present embodiment, corresponding weights are set for the RGB model and the Flow model respectively. When the first analysis result and the second analysis result are merged, the first analysis result and the second analysis result can be merged according to the weight, to obtain the target analysis result.

In an optional implementation of the present embodiment, it is assumed that the probability of the target object being a living body in the first analysis result is a1, and the probability of the target object being not a living body in the first analysis result is b1; the probability of the target object being a living body in the second analysis result is a2, and the probability of the target object being not a living body in the second analysis result is b2; then, a1, b1, a2, and b2 can be taken as one matrix [a1, b1, a2, b2] of 1*4.

In this occasion, the preset weight can be one 4*2 weight matrix. At this time, the matrix [a1, b1, a2, b2] of 1*4 can be multiplied with the 4*2 weight matrix, to obtain two numeric values, i.e., A and B, where A is a probability of the target object being a living body in the target analysis result, and B is a probability of the target object being not a living body in the target analysis result.

It needs to specify that in the present embodiment, the preset weight is calculated by a neutral network. In particular, it is the neutral network that determines the weight according to the first analysis result and the second analysis weight.

After the target analysis result is obtained, it is determined whether the target object is a living body according to the target analysis result, in particular comprising following steps:

(1) determining that the target object is a living body when it is determined that the probability of the target object being a living body is greater than a first threshold in the target analysis result; or (2) determining that the target object is not a living body when it is determined that the probability of the target object being not a living body is greater than a second threshold in the target analysis result; or (3) determining that the target object is not a living body when it is determined that the probability of the target object being a living body is smaller than a third threshold in the target analysis result; or (4) determining that the target object is a living body when it is determined that the probability of the target object being not a living body is smaller than a fourth threshold in the target analysis result.

In particular, the first threshold, the second threshold, the third threshold and the fourth threshold are predetermined values. The present disclosure does not limit the specific values of the first threshold, the second threshold, the third threshold and the fourth threshold. For example, the first threshold and the second threshold may be valued as 0.8, or first threshold may be valued as 0.85, or the second threshold may be valued as 0.75.

It can be known according to the above description that in the present embodiment, in the method of performing living body detection on the target object by adopting the RGB image and the Flow image, the optical flow method is applied to the living body detection. A conventional living body detection method is mostly based on a single frame image. As a result, this method loses lots of information between the images. However, the living body detection method provided in the embodiment is based on a short video, extracts optical flow information between frames as well as previous and subsequent frames from the videos, and performs living body detection on the videos with the help of the image frames and the optical flow information, and also achieves or even exceeds the effect of the previous living body detection method based on a single frame image; furthermore, this living body detection method eliminates redundancy and reduces the computational amount by means of extracting frames sparsely. In addition, the user can complete the living body detection only if he or she gazes at the screen for 2-3 seconds, without making any complicated gesture such as opening mouth, winking, etc., so that the user experience is improved greatly, the living body detection complexity is reduced, and the detection efficiency is increased.

There is further provided in an embodiment of the present disclosure a living body detection apparatus, which is mainly configured to execute the living body detection method provided in the above content of the embodiment of the present disclosure. The living body detection apparatus provided in the embodiment of the present disclosure will be introduced below in detail.

Figure 7:
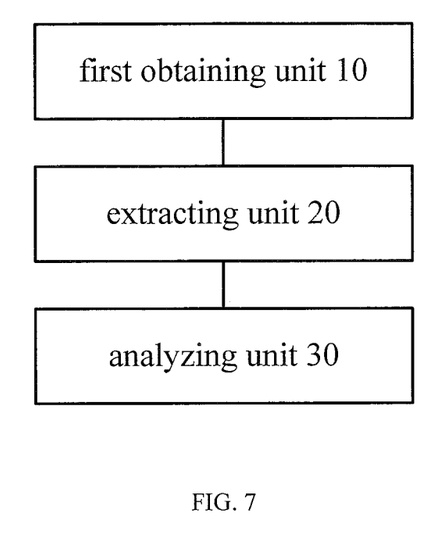
FIG. 7 is a schematic diagram of a living body detection apparatus provided in an embodiment of the present disclosure.

FIG. 7 is a schematic diagram of a living body detection apparatus according to an embodiment of the present disclosure. As shown in FIG. 7, the living body detection apparatus mainly comprises a first obtaining unit 10, an extracting unit 20 and an analyzing unit 30, wherein:

the first obtaining unit 10, configured to obtain video images of a target object, the video images including a plurality of image frames, each of which comprises facial information of the target object;

the extracting unit 20, configured to extract a first image and a second image from the video images, wherein the first image is used to represent static information in the video images, and the second image is used to represent position change information of all pixel points in the video images;

the analyzing unit 30, configured to make a living body analysis on the first image to obtain a first analysis result, make a living body analysis on the second image to obtain a second analysis result, and determine whether the target object is a living body according to the first analysis result and the second analysis result.

In the present embodiment, static image information and optic flow information (i.e., position change information of the pixel points) in the videos are fully utilized to perform living body detection. Furthermore, the present disclosure does not need the user to make various gestures such as opening mouth, winking, etc., and has advantages of simple and convenient use, high accuracy and high security level, so that the technical problem of low security level and complicated gesture difficulty for a user in a conventional living body detection technique is alleviated.

Figure 8:
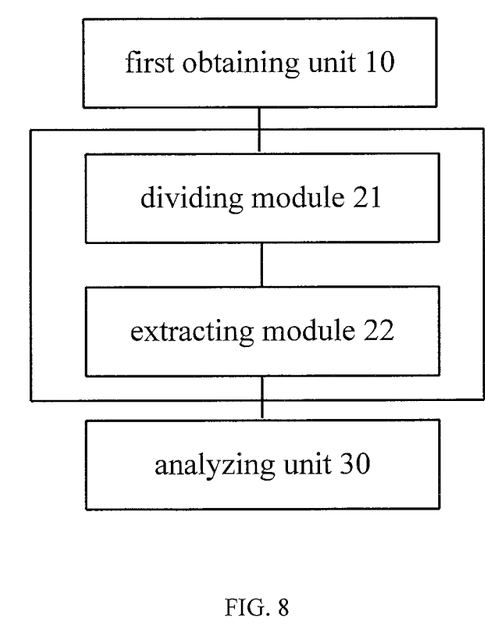
FIG. 8 is a schematic diagram of another living body detection apparatus provided in an embodiment of the present disclosure.

Optionally, as shown in FIG. 8, the extracting unit 20 comprises: a dividing module 21, configured to divide the video images into N video image groups, where N is a positive integer greater than 1; an extracting module 22, configured to extract one the first image from each of the video image groups, and extract M continuous second images from each of the video image groups, where M is a positive integer greater than 1.

Optionally, the extracting module 22 comprises: a random selection sub-module, configured to select M continuous image frames from each of the video image groups randomly; an extracting sub-module, configured to extract one second image from each image frame of the M continuous image frames.

Optionally, the extracting sub-module is further configured to: extract a first sub-image from the image frame $A_j$, wherein the first sub-image includes first displacement information, which represents displacement information of pixel points in the direction of axis X in an image frame and the image frame $A_j$; extract a second sub-image from the image frame $A_j$, wherein the second sub-image includes second displacement information, which represents displacement information of pixel points in the direction of axis Y in the image frame and the image frame $A_j$; wherein the image frame $A_i$ is an i-th image frame of the M continuous image frames, and i is a value from 1 to M in sequence.

Optionally, the analyzing unit comprises: a first analyzing module, configured to make a living body analysis on the first image through a first detection module of the target living body detection modules to obtain a first analysis result, wherein the first analysis result includes: a probability of the target object being a living body and/or the target object being not a living body; a second analyzing module, configured to make a living body analysis on the second image through a second detection module of the target living body detection modules to obtain a second analysis result, wherein the second analysis result includes: a probability of the target object being a living body and/or the target object being not a living body; a merging module, configured to merge the first analysis result and the second analysis result to obtain the target analysis result, and determine whether the target object is a living body according to the target analysis result, wherein the target analysis result includes: a probability of the target object being a living body and/or the target object being not a living body.

Optionally, the merging module further comprises: an obtaining module, configured to obtain a preset weight, wherein the preset weight includes weight of the first analysis result and a weight of the second analysis result; a merging sub-module, configured to merge the first analysis result and the second analysis result according to the preset weight to obtain the target analysis result.

Optionally, the apparatus further comprises: a first determination unit, configured to determine that that the target object is a living body when it is determined that the probability of the target object being a living body is greater than a first threshold in the target analysis result; or, a second determination unit, configured to determine that the target object is not a living body when it is determined that the probability of the target object being not a living body is greater than a second threshold in the target analysis result.

Optionally, the apparatus further comprises: a second obtaining unit, configured to obtain training video collections, wherein the training video collections include a first type of video collection and a second type of video collection, image frames of the first type of video collection including facial information when a face of a living body object is in a static state, image frames of the second type of video collection including facial information when a face of a non-living body object is in a static state; an image extracting unit, configured to extract images from the first type of video collection and the second type of video collection to obtain a first image set and a second image set, wherein images in the first image set are used to represent static information of training videos in the training video collections, and images in the second image set are used represent position change information of all the pixel points in the training videos; a training unit, configured to train original living body detection modes by utilizing the first image set and the second image set to obtain target living body detection models.

Optionally, the training unit comprises: a first training module, configured to train a first original detection model of the original living body detection models by utilizing the first image to obtain a first detection model of the target living body detection models; a second training module, configured to train a second original detection module of the original living body detection models by utilizing the second image set to obtain a second detection module of the target living body detection models.

Implementation principles and produced technical effects of the apparatus provided in the embodiment of the present disclosure are the same as those in the previous method embodiments. For the purpose of brief description, the content not mentioned in the part of the apparatus embodiment could refer to the corresponding content of the method embodiments described above.

Figure 9:
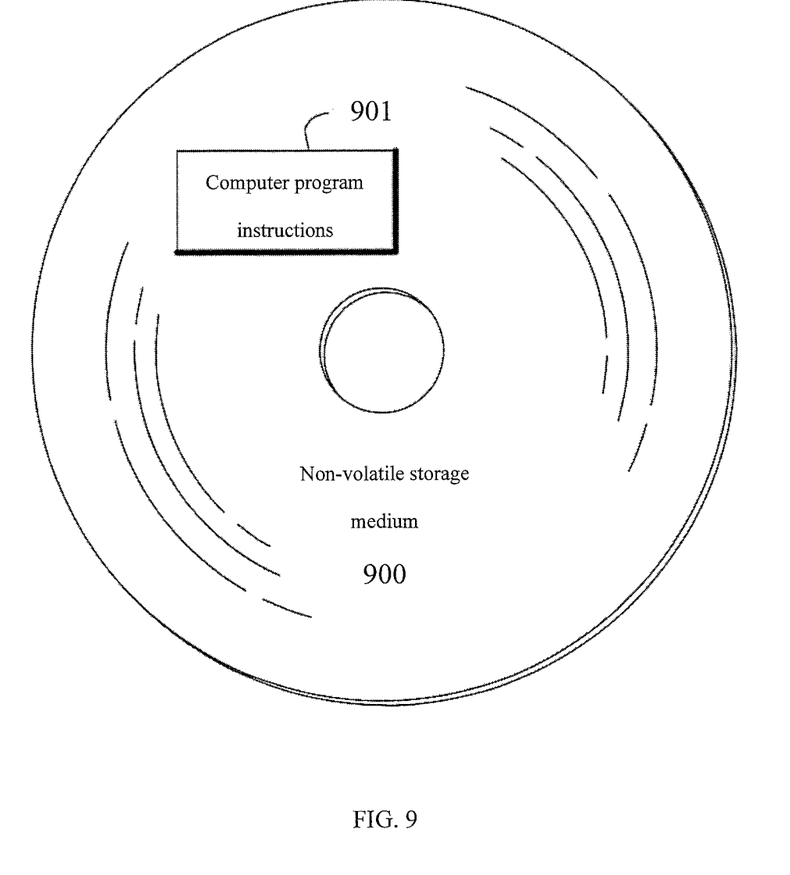
FIG. 9 is a schematic diagram of a non-volatile storage medium according to an embodiment of the present disclosure.

In another embodiment, there is further provided in an embodiment of the present disclosure a non-volatile storage medium. As shown in FIG. 9, the non-volatile storage medium 900 storing computer program instructions 901, and the computer program instructions 901 are executed by a computer to perform the steps of the method as described in any random embodiment of the above method embodiments.

Additionally, in the description of the embodiments of the present disclosure, unless otherwise expressly stated and defined, terms of "install", "connected to", "connected with" shall be understood broadly. For example, connection may be a fixed connection, or may be a detachable connection, or an integral connection; it may be a mechanical connection, or may be an electric connection; may be a direct connection, or may be a connection via an intermediate media, or may be a connection inside two elements. For those ordinary skilled in the art, specific meaning of the above terms in the present disclosure can be understood particularly.

In the description of the present disclosure, it needs to note that orientations or positional relationships indicated by terms of "center", "up", "down", "left", "right", "vertical", "horizontal", "inside" and "outside" are orientations or positional relationship shown based on the accompanying figures, and are just used for making it convenient to describe the present disclosure or simplify the description, instead of indicating or suggesting that the units or elements referred to have to be in a specific orientation and have to be constructed and operated in a specific orientation, so that they cannot be understood as limitations to the present disclosure. In addition, terms of "first", "second", and "third" are only used for description, and cannot be understood as indicating or suggesting relative importance.

Those skilled in the art can know clearly that for the purpose of convenient and brief description, specific operation processes of the system, apparatus and unit described above can refer to the corresponding process in the previous method embodiments, and thus no further details are given herein.

In the several embodiments provided in the present application, it shall be understood that the disclosed system, apparatus and method can be implemented by other means. The apparatus embodiments described above are just for illustration, for example, division of the units is just a division of logic functions. There may be other division manners in the actual implementation; for another example, a plurality of units or components can be combined or integrated into another system, or some features can be omitted, or not executed. Additionally, coupling between each other or direct coupling or communication connection displayed or discussed can be indirect coupling or communication connection through some communication interfaces, apparatuses or units, and it may be electrical, mechanical or other forms.

A unit described as a detaching component may be or may not be separated physically. A unit described as a display component may be or may not be a physical unit, that is, it may be located at one place, or may be distributed on a plurality of network units. A part or all or the units can be selected according to the actual requirements to realize the purpose of the solutions of the present embodiment.

Additionally, respective functional units in respective embodiments of the present disclosure can be integrated into one analyzing unit, or each unit exists separately and physically, or two or more units can be integrated into one unit.

If the functions are realized in a form of a software function unit and sold or used as an independent product, they can be stored in a computer readable medium of a non-volatile program code executable by an analyzer. Based on such understanding, the technical solutions of the present disclosure in substance or the part contributing to the prior art or the part of the technical solutions can be reflected in a form of a software product. The computer software product is stored into one storage medium, comprising several instructions to enable a computer device (it may be a personal computer, a server, or a network device, etc.) to execute all or part of steps of the method according to the respective embodiments. The previous storage medium includes various medium being capable of storing program codes, such as a U disk, a portable hard disk, a read-only memory (ROM), a magnetic disk or an optical disk, etc.

Finally, it shall specify that the above embodiments are just specific implementations and are used to describe the technical solutions of the present disclosure, but are not used to limit the present disclosure. The protection scope of the present disclosure is not limited thereto. Although the present disclosure is described in detail by referring to the previous embodiments, those ordinary skilled in the art shall understood that any skilled in the art being familiar with the technical field can still amend the technical solution disclosed in the previous embodiments, make modifications easily conceived, or make equivalent replacements of a part of technical features; these amendments, modifications or replacements do not make the spirit of the corresponding technical solutions depart from the spirit and scope of the technical solutions of the embodiments of the present disclosure shall be coved within the protection scope of the present disclosure. Therefore, the protection scope of the present disclosure shall be subject to the protection scope of the claims.

What is claimed is:

1. A living body detection method, comprising:
    obtaining video images of a target object, wherein the video images include a plurality of image frames, each of which includes facial information of the target object;
    extracting a first image and a second image from the video images, wherein the first image is used to represent static information in the video images, and the second image is used to represent position change information of all pixel points in the video images;
    making a living body analysis on the first image to obtain a first analysis result, making a living body analysis on the second image to obtain a second analysis result, and determining whether the target object is a living body according to the first analysis result and the second analysis result,
    wherein making a living body analysis on the first image to obtain a first analysis result, making a living body analysis on the second image to obtain a second analysis result, and determining whether the target object is a living body according to the first analysis result and the second analysis result, comprise:
    making a living body analysis on the first image through a first detection model of target living body detection models to obtain the first analysis result, wherein the first analysis result includes: a probability of the target object being a living body and/or a probability of the target object being not a living body;
    making a living body analysis on the second image through a second detection model of target living body detection models to obtain the second analysis result, wherein the second analysis result includes: a probability of the target object being a living body and/or a probability of the target object being not a living body;
    merging the first analysis result and the second analysis result to obtain a target analysis result, and determining whether the target object is a living body according to the target analysis result, wherein the target analysis result includes: a probability of the target object being a living body and/or a probability of the target object being not a living body.

2. The method according to claim 1, wherein extracting a first image and a second image from the video images comprises:
    dividing the video images into N video image groups, where N is a positive integer greater than 1;
    extracting one first image from each of the video image groups, and extracting M continuous images from each of the video image groups, where M is a positive integer greater than 1.

3. The method according to claim 2, wherein extracting M continuous images from each of the video image groups comprises:
    selecting M continuous image frames from each of the video image groups randomly;
    extracting one second image from each image frame of the M continuous image frames.

4. The method according to claim 3, wherein the second image comprises a first sub-image and a second sub-image, and extracting one second image from each image frame of the M continuous image frames comprises:
    extracting the first sub-frame from an image frame $A_i$, wherein the first sub-image includes first displacement information, which indicates displacement information of pixel points in the direction of axis X in an image frame $A_{i-1}$ and the image frame $A_i$;
    extracting the second sub-frame from the image frame $A_i$, wherein the second sub-image includes second displacement information, which indicates displacement information of pixel points in the direction of axis Y in the image frame $A_{i-1}$ and the image frame $A_i$;
    wherein the image frame $A_i$ is an i-th image frame of the M continuous image frames, and i is a value from 1 to M in sequence.

5. The method according to claim 1, wherein merging the first analysis result and the second analysis result to obtain a target analysis result comprises:
    obtaining a preset weight, wherein the preset weight includes a weight of the first analysis result and a weight of the second analysis result;
    merging the first analysis result and the second analysis result according to the preset weight to obtain the target analysis result.

6. The method according to claim 1, wherein determining whether the target object is a living body according to the target analysis result comprises:
    determining that the target object is a living body when it is determined that the probability of the target object being a living body is greater than a first threshold in the target analysis result; or
    determining that the target object is not a living body when it is determined that the probability of the target object being not a living body is greater than a second threshold in the target analysis result.

7. The method according to claim 1, wherein the method further comprise:

obtaining training video collections, wherein the training video collections include: a first type of video collection and a second type of video collection, image frames of the first type of video collection including facial information of a living body object, image frames of the second type of video collection including facial information when a face of a non-living body object is in a static state;

extracting images of the first type of video collection and the second type of video collection to obtain a first image set and a second image set, wherein images in the first image set are used to represent static information of training videos in the training video collections, and images in the second image set are used to represent position change information of all pixel points in the training videos;

training original living body detection models by utilizing the first image set and the second image set to obtain the target living body detection models.

8. The method according to claim 7, wherein training original living body detection models by utilizing the first image set and the second image set to obtain the target living body detection models comprises:

training a first original detection model of the original living body detection models by utilizing the first image set to obtain a first detection model of the target living body detection models;

training a second original detection model of the original living body detection models by utilizing the second image set to obtain a second detection model of the target living body detection models.

9. An electronic device, comprising:
a memory adapted to store computer program instructions; and
a processor adapted to execute the computer program instructions to perform the living body detection method according to claim 1.

10. A non-transitory storage medium storing computer program instructions for performing the living body detection method according to claim 1, when a computer executes the computer program instructions.

* * * * *